Figure 3:
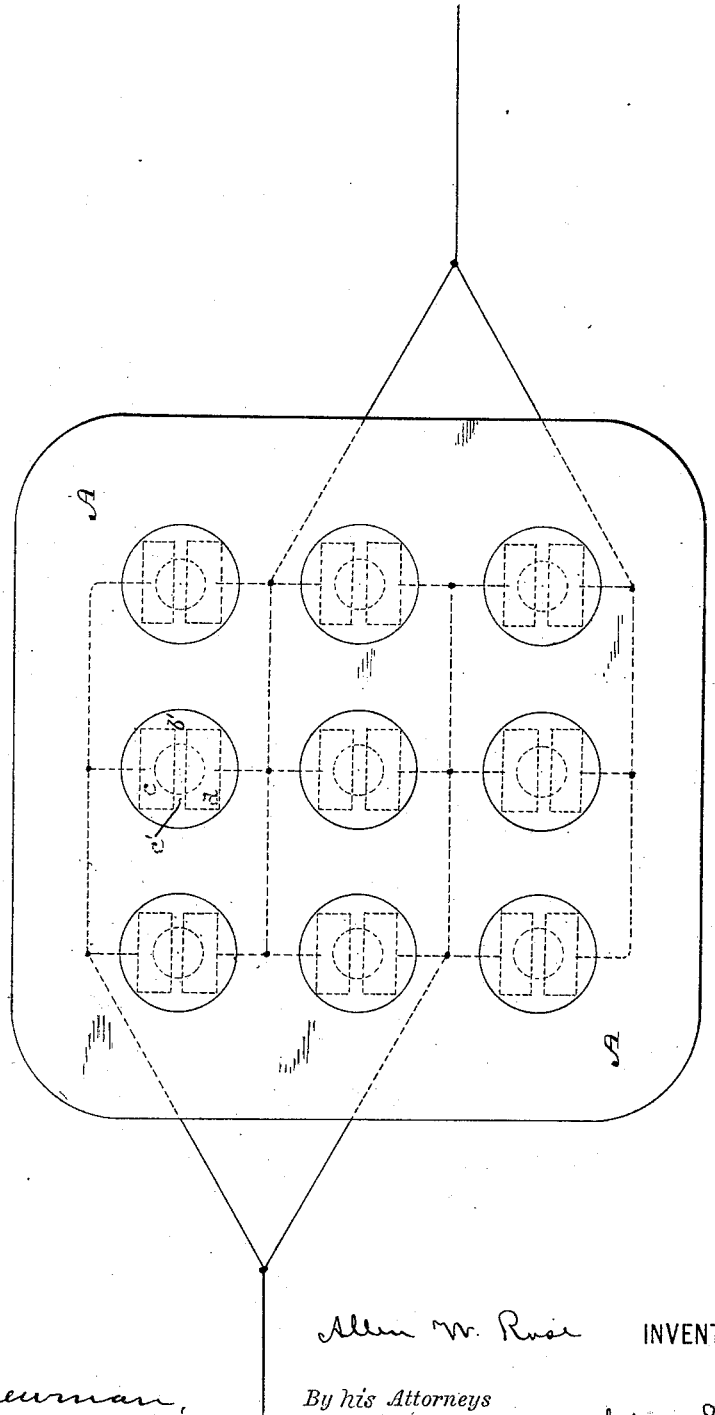

(No Model.)  4 Sheets—Sheet 1.
A. W. ROSE.
TELEPHONE TRANSMITTER.
No. 354,241.  Patented Dec. 14, 1886.
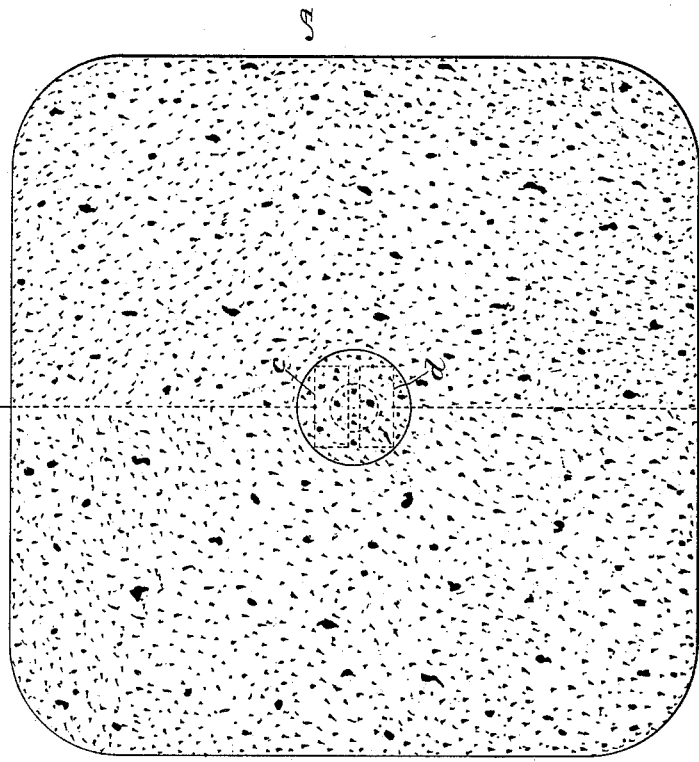
WITNESSES
Ed. A. Newman
Al. C. Newman
Allen W. Rose  INVENTOR
By his Attorneys
Baldwin Hopkins & Peyton (No Model.) 4 Sheets—Sheet 2.
A. W. ROSE.
TELEPHONE TRANSMITTER.

No. 354,241. Patented Dec. 14, 1886.

WITNESSES
Ed. A. Newman,
Al. C. Newman.

Allen W. Rose INVENTOR
By his Attorneys
Baldwin Hopkins & Peyton (No Model.) 4 Sheets—Sheet 3.
A. W. ROSE.
TELEPHONE TRANSMITTER.
No. 354,241. Patented Dec. 14, 1886.
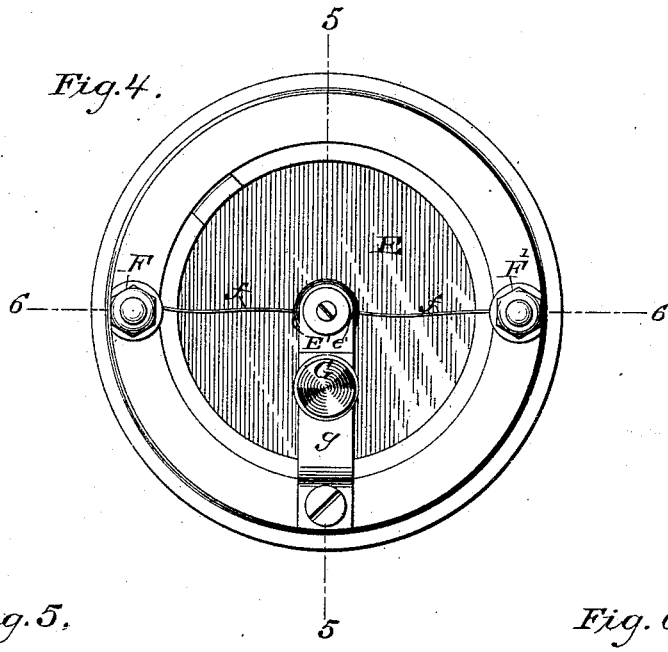
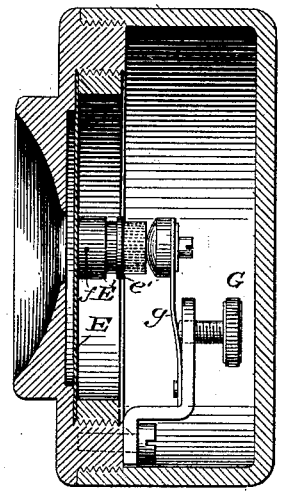
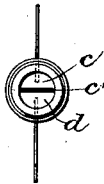
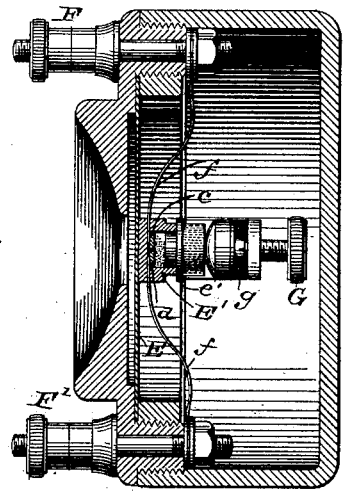
Witnesses
Wm A. Skinkle
Geo. W. Breck
Allan W. Rose  Inventor
By his Attorneys
Baldwin Hopkins & Peyton
N. PETERS, Photo-Lithographer, Washington, D. C.

(No Model.)

A. W. ROSE.
TELEPHONE TRANSMITTER.

No. 354,241. Patented Dec. 14, 1886.

4 Sheets—Sheet 4.

UNITED STATES PATENT OFFICE.

ALLEN W. ROSE, OF NEW YORK, N. Y.

TELEPHONE-TRANSMITTER.

SPECIFICATION forming part of Letters Patent No. 354,241, dated December 14, 1886.

Application filed October 20, 1884. Serial No. 146,011. (No model.)

*To all whom it may concern:*

Be it known that I, ALLEN W. ROSE, a citizen of the Dominion of Canada, now residing in the city, county, and State of New York, have invented certain new and useful Improvements in Electric Transmitting-Telephones, of which the following is a specification.

My invention relates to transmitters of that class in which variations in the strength of an electric current are produced by varying the resistance of a portion of the circuit.

The object of my invention is to greatly simplify the structure and improve the operation of telephone-transmitters, and also to produce a telephone which does not require adjustment, that may be handled with freedom, and will operate perfectly in almost any position in which it is held. To accomplish this end I employ finely-divided conducting material in a loose state in the circuit of the transmitter, and carried by or within the body of the support or plate or medium through or by means of which the vibrations created by the utterance of a sound are caused to act upon such finely-divided material.

My invention is applicable to that class of instruments in which an ordinary diaphragm is employed, but is not confined to that class of instruments. On the contrary, it is proposed to apply the invention to any other class of instruments in which molecular vibrations are relied upon to produce the variations in the transmitting-circuit, or where any vibrations other than those of an ordinary telephone-diaphragm are relied upon to produce that result. As a matter of fact, I prefer to construct my improved instrument of a plate or block of cork, wood, or such like material, within the body of which the transmitting-electrodes and divided conducting material are carried. Such a plate may or may not be confined at its edges, and is preferably unconfined. I have, however illustrated, and will describe, the application of the invention to telephones of the common type, in which an ordinary vibrating telephone diaphragm is employed.

My invention contemplates other improvements, which will now be described. It should be understood, however, that some of said improvements may be used without the others in instruments differing perhaps in some respects from those herein described.

Figure 8:
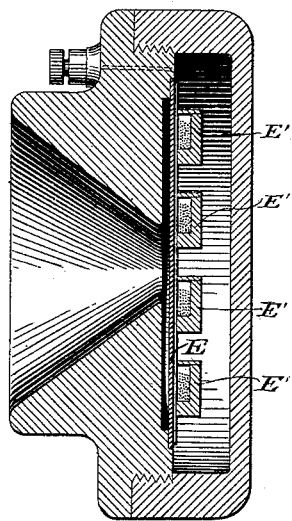
Figure 9:
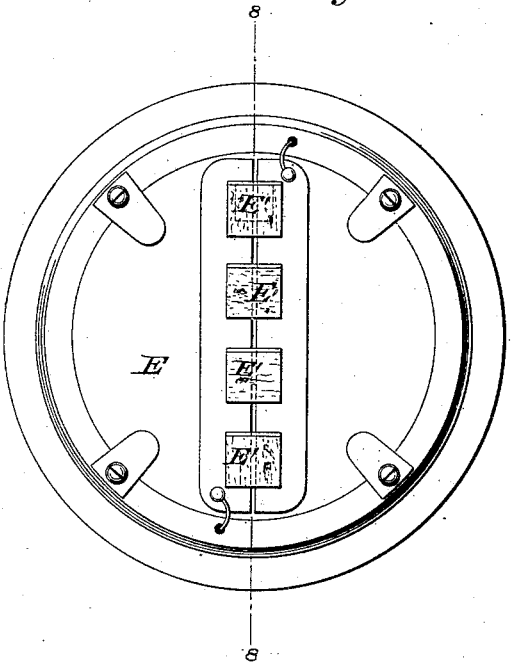

In the accompanying drawings, Figure 1 is a plan view of a transmitter constructed in accordance with the preferred manner of carrying out my invention. Fig. 2 is a transverse section therethrough. Fig. 3 is a diagram view illustrating an instrument of the same class with a multiplicity of electrodes or terminals connected in multiple arc. Fig. 4 represents a plan or top view of an instrument embodying my invention equipped with an ordinary diaphragm. Fig. 5 is a vertical section therethrough on the line 5 5 of Fig. 4. Fig. 6 is a horizontal section on the line 6 6 of Fig. 4. Fig. 7 is a detail view showing the arrangement of the terminals or electrodes of the circuit. Fig. 8 represents a vertical transverse section through another form of instrument on the line 8 8 of Fig. 9; and Fig. 9 is a rear view of the instrument shown in Fig. 8, with the back piece removed.

Referring to Figs. 1 and 2, it will be perceived that the support, plate, or medium A, by means of or through which the transmitting-circuit is to be varied, is formed with a recess, $a$, which is preferably closed on each side with a plug, $b$ or $b'$, within which the terminal plates or electrodes $c\ d$, which are preferably of platinum or some other non-corrodible or non-oxidizable conducting material, are placed. These plates are preferably arranged with their edges toward each other in the same plane, and are preferably separated by a block of insulating material, $c'$.

Within the cavity between the plug $b$ and the electrodes $c\ d$, I place in a loose condition some finely-divided conducting material, which forms a bridge or variable electrical connection between the electrodes. I preferably employ for this purpose finely-divided platinum, as I have obtained good results with such material, though any other suitable material may be used.

It will be observed that the receptacle $a$ is not completely filled with the finely-divided material. This is the preferred arrangement, and the extent to which the receptacle may be filled may of course be varied, as no exactness is necessary.

The instrument which I have described may or may not be supported at its edges, and is preferably unsupported. When spoken to, it may be held in the hand or stood up in almost any position, but is preferably placed so that the greatest lengths of the electrodes $c\ d$ will have a vertical direction instead of a horizontal one. Any position, however, which causes contact to be maintained between the finely-divided material and both conducting plates or electrodes will give good results. Whenever a sound is uttered in the vicinity of this instrument the vibrations of the atmosphere are transmitted by or through the block or medium A, and cause variations of the relative positions of the particles of finely-divided material, thus varying the resistance of the transmitting-circuit, as will be well understood.

The cheapness and simplicity of this instrument and its capacity for being handled with freedom will at once be perceived by those familiar with this art. It is therefore not only well adapted for use on ordinary subscribers' lines in city exchanges, but is also specially adapted for field use, where the transmitter is to be carried by the operator, as has been proposed in some instances, notably in that of the signal service or telegraph corps of the United States Army.

I do not limit this invention to the particular form of plate, block, or medium illustrated, nor to any particular material. Preferably I employ cork or some such elastic or compressible medium. Wood may be used, or rubber in its various conditions, or even a thick piece of felt.

It will be perceived that in the instrument I have described the finely-divided conducting material is carried entirely within or upon a support, through which or by means of which the vibrations of the atmosphere are caused to act upon it in contradistinction to the method heretofore employed of supporting finely-divided conducting material on one side by an independent support, against which it is compressed by the vibration of an ordinary diaphragm. As before mentioned, the electrodes are placed edge to edge in the same plane and the finely-divided conducting material forms a bridge connecting them. I greatly prefer this construction, because it prevents a packing or compressing of the finely-divided conducting material; but the principles of my invention, considered broadly, would include any other relative arrangement of the electrodes—as, for instance, placing one beyond the other, with the finely-divided conducting material between them.

My invention also contemplates the use of finely-divided non-corrodible or non-oxidizable metal, as the best results may be obtained with such material, and it does not deteriorate by use.

In this connection, I am aware that the use of finely-divided conducting material in a loose and free state has heretofore been patented, the material employed consisting of powdered carbon. I also here mention that in patents heretofore granted to me magnetic filings sustained in a magnetic field are shown.

Referring now to Fig. 3, I have there shown a multiplicity of transmitting-electrodes, the several pairs being connected in multiple arc, as is clearly shown in the figure. The effect of such an arrangement as this is that the results of the sum of the vibrations of the different parts of the supporting block, plate, or medium are thrown upon the line-wire. These pairs of terminals may be arranged in any order, or placed indiscriminately on or upon the support or medium A. For instance, referring to Fig. 9, they are there shown as arranged in a row across the face of an ordinary telephone-diaphragm. An instrument such as illustrated in Fig. 3 would possess great delicacy, and would yet have a capacity of transmitting the loudest sounds.

In Figs. 4 to 9, inclusive, I have shown an ordinary type of instrument now in general use equipped with the insulated plates arranged edge to edge and connected by a bridge of finely-divided conducting material in a loose and free state. A diaphragm or support, E, may be secured in the case in any usual way. This diaphragm may be of metal—such as the ordinary diaphragms in use—but is preferably made of some other material—such as mica, rubber, cork, wood, leather, or other suitable material.

In Figs. 4, 5, and 6 I show a single cup or receptacle, E', attached to the diaphragm and containing finely-divided conducting material in a loose condition. The receptacle is closed by a flanged stopper or cover, $e'$. Wires $f$, connected with binding-posts F F', conduct the current to the electrodes or plates $c\ d$, which are arranged edge to edge and electrically connected by the loose bridge of finely-divided material. The drawings show a spring-arm, $g$, which bears against the receptacle on the diaphragm and is controlled by an adjusting-screw, G. This part of the apparatus merely acts as a check on the diaphragm, and not in any sense as a compressor of the finely-divided material. It may be convenient under some circumstances, but it is not essential, and in practice I would prefer to dispense with it.

In Figs. 8 and 9 I have illustrated a row of receptacles or cups placed across the diaphragm with the electrodes in the several cups connected in multiple arc in the transmitting-circuit, as is well understood, and clearly shown in the drawings.

I am aware of what is known as the "molecular telephone" shown in various patents to Lockwood and Lockwood and Bartlett.

I am also aware of British Patent No. 749 of 1882, in which finely-divided conducting material is carried within recesses or perforations in a sheet of felt, the plate-electrodes being placed on opposite sides of the felt and covering the perforations therein. I do not, therefore, claim such subject-matter.

I am also aware of the United States Patent of Husband, No. 299,073, in which the vibrating diaphragm forms part of the transmitting-circuit and is divided into two parts which are separated by a section of insulating material, the two parts of the diaphragm being electrically connected by a bridge of finely-divided conducting material; and I do not, therefore, claim such a structure.

I do not broadly claim interposing finely-divided conducting material in a telephone-circuit.

I am aware of British Patents No. 5,113 of 1880, No. 5,001 of 1882, No. 329 of 1882, and No. 2,451 of 1882, and of United States Patents to Edison, No. 266,021, Anders, No. 252,641, and Watson, No. 226,376; and I do not claim any subject-matter set forth in any of said patents, but limit myself to the matter specifically claimed below.

I claim as my invention—

1. The combination of the terminals or electrodes of a transmitting-circuit, finely-divided conducting material in a free and loose condition in contact with said electrodes, and a supporting medium having a socket or perforation therein within which said electrodes and finely-divided material are carried, and which also constitutes the medium through or by means of which the vibrations of the atmosphere are caused to act on the finely-divided material, as described.

2. The combination, substantially as set forth, of a plate or block of cork or equivalent material with the transmitting-electrodes and finely-divided conducting material in a loose state in contact with said electrodes carried within the body of said plate or block, said block constituting the medium through or by means of which the vibrations of the atmosphere are caused to act on the finely-divided material, as described.

3. A transmitting-telephone consisting of an unconfined plate or block of cork or other suitable material formed with a recess therein, in combination with the electrodes of a transmitting-circuit and finely-divided conducting material in a loose state in contact with said electrodes, both of which are carried within the recess in the plate or block which constitutes the medium through or by means of which the vibrations of the atmosphere are caused to act on the finely-divided material, as described.

4. The combination, substantially as set forth, of a supporting medium, the terminals or electrodes of a voltaic or galvanic circuit carried thereby, and finely-divided platinum placed in a loose state in contact with said terminals to vary the strength of the current, as described.

5. The combination, substantially as set forth, of a supporting block or medium, two or more pairs of electrodes carried within recesses in said block or support, finely-divided conducting material for electrically connecting the electrodes of each pair, also carried within said recesses, and a transmitting-circuit in which the pairs of electrodes are connected in multiple arc, as set forth.

6. The combination of the supporting plate or block which constitutes the medium by means of which the vibrations of the atmosphere are made effective, the transmitting-circuit, the electrodes carried by said plate or block and arranged edge toward edge in the same plane, as set forth, and finely-divided conducting material in a loose and free state, also carried by said plate or block, in contact with said electrodes.

In testimony whereof I have hereunto subscribed my name.

ALLEN W. ROSE.

Witnesses:
HERMANN GELPEKE,
W. L. CANDEE.